Patented Mar. 30, 1937

2,075,269

UNITED STATES PATENT OFFICE 2,075,269

SOLVENT REFINING OF MINERAL OIL

Louis A. Clarke, Fishkill, and Charles C. Towne, Beacon, N. Y., assignors to The Texas Company, New York, N. Y., a corporation of Delaware No Drawing. Application April 17, 1935, Serial No. 16,754

4 Claims. (Cl. 196—13)

This invention relates to refining hydrocarbon oil and more particularly to refining mineral oil such as mineral lubricating oil by solvent extraction.

The invention contemplates the treatment and refining of mineral oil with a selective solvent liquid to separate therefrom undesired constituents. It contemplates particularly the treatment of lubricating oil to produce therefrom lubricating oil products of desired characteristics.

The invention comprises solvent refining mineral oil with a solvent selected from the halogen derivatives of alkyl aryl ethers, such as chlormethyl phenyl ether and chlorethyl phenyl ether. The halogen derivatives of alkyl aryl ethers which we have found suitable as solvents for solvent refining mineral oil are those derivatives where the halogen element is attached to the alkyl side chain of the compound. Beta-chlorethyl phenyl ether, for example, is one of the compounds which we have found suitable as a solvent refining agent and which has the following formula:

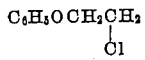

While the beta form of compound has been indicated above, it is contemplated also that the alpha compounds may be used for solvent refining.

Lubricating oil fractions derived from mixed base crude such as Mid-Continent crude contain relatively paraffinic constituents as well as relatively non-paraffinic constituents including naphthenic, aromatic and unsaturated hydrocarbon bodies. We have found that the halogen derivatives of alkyl aryl ethers above mentioned, are particularly well adapted to the treatment of mineral lubricating oil fractions to effect separation between the paraffinic and relatively non-paraffinic constituents. Accordingly, the solvent liquids of my invention are adapted to remove relatively non-paraffinic constituents from lubricating oil and produce therefrom lubricating oil products of highly paraffinic character and having a relatively high viscosity index.

In the application of our invention to the treatment of mineral oil for the production of lubricating oil, one part of the oil is mixed with from about one to two parts or more of the solvent liquid. This mixture is then subjected to agitation at a suitable temperature, as for example, around 30 to 90° F. and then separated into an extract phase and a raffinate phase. The extract phase comprises the non-paraffinic constituents of the oil dissolved in the solvent liquid while the raffinate phase comprises the relatively paraffinic constituents of the oil.

The two phases are separated from each other and the solvent removed therefrom by distillation or by washing with another suitable solvent liquid.

The extent to which the oil is soluble in the solvent depends upon the nature of the oil as well as the temperature of extraction and the ratio of solvent liquid to oil employed during extraction. The extraction temperature and the ratio of solvent to oil may be varied for the purpose of effecting the particular degree of extraction desired. Consequently in some instances it may be desirable to employ temperatures either somewhat below or somewhat higher than those mentioned above and likewise the ratio of solvent to oil may be either greater or less than that specified.

The extraction may be carried out in a continuous countercurrent type of operation or in an intermittent batch type of operation. In the continuous countercurrent type of operation, the ratio of oil to solvent may be somewhat less than that used in the batch type of operation. Where the extraction is carried out in the countercurrent tower type of apparatus the ratio of solvent to oil is usually around one to two parts of solvent to one part of oil.

By way of specific example, the untreated dewaxed distillate lubricating oil derived from Mid-Continent crude and having a viscosity index of around 50 is mixed with chlorethyl phenyl ether in the proportion of about two parts of ether to one part of oil. This mixture is subjected to agitation at a temperature of around 70° F. and allowed to separate into extract and raffinate phases. The phases are separated and the solvent liquid removed therefrom. The resulting raffinate will comprise about 70 percent of the untreated oil and will have a viscosity index of around 80.

In some instances it may be of advantage to carry out the extraction in the presence of a modifying solvent liquid such as benzol or a light petroleum fraction such as propane or butane for the purpose of facilitating the extraction and further controlling the extent thereof.

The lubricating oil distillate may be subjected to the foregoing extraction treatment either before or after dewaxing and also either before or after treatment with other solvents or chemicals.

The invention is not necessarily limited to the treatment of lubricating oil fractions since the solvent may be adapted to the refining and purification of hydrocarbon or mineral oil fractions including naphtha, kerosene, etc., as well as residual or distillate fractions.

While chlorinated ether compounds have been specifically mentioned above, it is contemplated that other halogen compounds of these ethers including the fluoro, bromo and iodo compounds may be used.

Obviously many modifications and variations of the above invention, as hereinbefore set forth, may be made without departing from the spirit and scope thereof, and therefore only such limitations should be imposed as are indicated in the appended claims.

We claim:

1. In the refining of mineral lubricating oil containing relatively paraffinic and relatively non-paraffinic constituents, to separate therefrom a paraffinic fraction of relatively high viscosity index, the method which comprises mixing the oil with a solvent selected from the group consisting of chlormethyl phenyl ether and chlorethyl phenyl ether, forming an extract phase containing relatively non-paraffinic constituents of the oil dissolved in the solvent liquid and a raffinate phase comprising the relatively paraffinic constituents of the oil, separating the two phases and removing the solvent liquid therefrom.

2. In the refining of mineral lubricating oil containing relatively paraffinic and relatively non-paraffinic constituents, to separate therefrom a paraffinic fraction of relatively high viscosity index, the method which comprises mixing the oil with chlormethyl phenyl ether, forming an extract phase containing relatively non-paraffinic constituents of the oil dissolved in the solvent liquid and a raffinate phase comprising the relatively paraffinic constituents of the oil, separating the two phases and removing the solvent liquid therefrom.

3. In the refining of mineral lubricating oil containing relatively paraffinic and relatively non-paraffinic constituents, to separate therefrom a paraffinic fraction of relatively high viscosity index, the method which comprises mixing the oil with beta chlorethyl phenyl ether, forming an extract phase containing relatively non-paraffinic constituents of the oil dissolved in the solvent liquid and a raffinate phase comprising the relatively paraffinic constituents of the oil, separating the two phases and removing the solvent liquid therefrom.

4. In the refining of hydrocarbon oil containing relatively paraffinic and relatively non-paraffinic constituents to separate the oil into fractions respectively rich in paraffinic and non-paraffinic constituents, the method which comprises mixing the oil with a solvent selected from the group consisting of chlormethyl phenyl ether and chlorethyl phenyl ether, forming an extract phase containing non-paraffinic constituents dissolved in the solvent and a raffinate phase comprising paraffinic constituents of the oil, and separating the two phases.

LOUIS A. CLARKE.
CHARLES C. TOWNE.